United States Patent Office 2,974,109
Patented Mar. 7, 1961

2,974,109
PREPARATION OF SILICA SOLS OF MINIMUM TURBIDITY

Lawrence A. Dirnberger, Westfield, N.J., and Robert T. Nelson, Pasadena, Tex., assignors to E. I. du Pont de Nemours and Company, Wilmington, Del., a corporation of Delaware No Drawing. Filed Feb. 12, 1958, Ser. No. 714,689

1 Claim. (Cl. 252—313)

This invention relates to processes for producing silica sols of minimum turbidity. More particularly the invention is directed to such processes in which the sol is made by neutralizing the alkali in an alkali metal silicate solution with a cation-exchanger in the hydrogen form at a pH above 8 while agitating the exchanger, wherein minimum turbidity in the sols is achieved by conducting the ion-exchange reaction at a temperature of 88 to 90° C. a sufficient proportion of the silicate being added to a heel of water to give a solution having a pH of from 8.3 to 8.7 and additional silicate solution and ion exchanger in hydrogen form being added to the heel over a period of 27 to 33 minutes and at such rates that the pH remains in the range of 8.3 to 8.7, and the pounds of $SiO_2$ as silicate added per pound of water in the heel being from 0.236 to 0.304.

Aqueous silica sols of the type described in Bechtold and Snyder U.S. Patent 2,574,902, particularly in Example 3 of that patent, have recently come into wide-spread commercial use. These stable sols are described as being characterized by having a silica:alkali weight ratio of from 60:1 to 130:1, by containing discrete silica particles having a molecular weight, as determined by light scattering, of more than one-half million, by having a relative viscosity, at 10 percent $SiO_2$, from 1.15 to 1.55, and by containing from 20 to 35 percent by weight of $SiO_2$. It is with the preparation of such sols that the present invention is especially concerned.

In addition to processes of said Patent 2,574,902 the processes described in Iler U.S. Patent 2,631,134 can advantageously be used for producing silica sols of this type. However, in some uses of the sols, such as in making mixtures where clarity of the ultimate product is of prime importance, any turbidity in the silica sol is regarded by the trade with suspicion. Hence, while a slight degree of turbidity is not objectionable in sols to be used for most purposes, provided it is not caused by incompletely dispersed gel aggregates, sols which are practically water-clear have come to be much in demand.

While the processes of the above-mentioned Patent 2,631,134 have numerous advantages, such as the direct production of sols of higher silica content than could be prepared by prior art processes, the sols produced do not have the maximum clarity desired in sols of highest quality and it has not hitherto been known whether or how water-clear sols could be consistently produced by the processes of the patent.

It is an object of the present invention to provide processes for producing silica sols of minimum turbidity. Another object is to provide such processes wherein the sols of minimum turbidity are directly produced in concentrated form. Further objects will appear hereinafter.

Now according to the present invention it has been found that silica sols which have minimum turbidity and, indeed, are substantially water-clear, can be produced directly in relatively concentrated form by processes in which the alkali in an alkali metal silicate solution is neutralized with a cation exchanger in the hydrogen form at a pH above 8 while agitating the exchanger, provided certain of the reaction conditions are controlled within narrow, critical limits. These critical conditions are that ion-exchange reaction is carried out at a temperature of 88 to 90° C. and a pH of 8.3 to 8.7, the silicate and the hydrogen form of the exchanger regenerated to contain no more than 0.1 pound equivalent of hydrogen ion per cubic foot is added over a period of 27 to 33 minutes to a heel consisting initially of water and enough silicate to raise the pH to the specified range, and the pounds of $SiO_2$ as silicate added per pound of water in the heel is from 0.236 to 0.304.

Except as otherwise herein stated, the materials used and the procedural steps followed in the processes of this invention are as described in the aforementioned Patent 2,631,134. Thus, the chemical reaction involved consists in bringing an alkali metal silicate solution into contact with a cation-exchanger in the hydrogen form, whereby the cation of the silicate is taken up by the exchanger and replaced with hydrogen ion, forming silicic acid. The rate of reaction is increased by agitating the exchanger. The silicic acid undergoes a polymerization by splitting out water between separate molecules and the molecular weight increases. This polymerization is accelerated by reason of the elevated temperature at which the reaction is carried out, but because the pH is maintained above 8 the silica does not undergo the type of polymerization which leads to the formation of a silica gel. Rather, the initially formed silica nuclei grow by the addition thereto of the subsequently formed silica so that ultimately there is present in the sol dense, substantially discrete particles of silica in the colloidal size range, and more particularly in a size range such that their surface area is about from 200 to 250 square meters per gram.

Any soluble alkali metal silicate may be used. Since sodium silicate is the cheapest and the most readily available of the soluble silicates the invention will hereinafter be described with respect to it, but potassium silicate and other alkali metal silicates can also be used. The silicate can have any mole ratio of $SiO_2:Na_2O$ desired, and the commercial silicates having ratios of from 1:1 (metasilicate) up to 3.9:1 are suitable. It will be remembered, however, that the pH of the reaction must be carefully controlled within the limits of 8.3 to 8.7 as measured directly in the reaction solution at operating temperature. Such control is sometimes easier with silicates of lower alkalinities.

The art is already familiar with insoluble cation-exchangers. Any of these may be used. Sulfonated carbonaceous exchangers, sulfonated or sulfited insoluble phenol-formaldehyde resins or acid-treated humic material, sulfonated coal, lignin, peat, or other humic organic material and synthetic resins can be used to advantage.

Preferred cation-exchange resins are those made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups.

Especially preferred cation-exchange resins are the aromatic hydrocarbon polymer type containing nuclear sulfonic acid groups designated "Dowex-50" and of the general type described in D'Alelio Patent 2,366,007 and in the Journal of the American Chemical Society for November 1947, volume 69, No. 11, beginning at page 2830.

The exchanger is initially in the hydrogen form and after it has been exhausted by use it can be regenerated to this form by treating with an acid, preferably an acid stronger than the acid groups on the resin.

When, in describing this invention, it is said that the alkali metal silicate is neutralized with the cation-exchange resin, the meaning is that the alkali metal ion is exchanged and the pH of the silicate is lowered to a figure below that of the original solution. The alkali metal silicate solution ordinarily has a pH somewhat above 11. The concentration of the alkali metal silicate solution employed can vary considerably provided that the pH is maintained between 8.3 and 8.7 in the reaction medium and further provided that due account is taken of the necessity for relating the pounds of $SiO_2$ added per pound of water in the heel as hereinafter more particularly described.

While it will be seen that relatively dilute silicate solutions can be used, in a preferred aspect of the invention a concentrated silica sol is directly produced and in this embodiment it is, of course, necessary to add a relatively concentrated silicate solution—that is one having an $SiO_2$ content of from 25 to 28.5 percent.

During the ion exchange reaction, the reaction medium is agitated. Agitation should be sufficiently vigorous to provide substantially instantaneous mixing of the added silicate with the reaction medium. Since it is critical to keep the pH within very close limits, the effectiveness of the agitation provided can be judged by measuring the pH simultaneously at different points in the reaction medium. If the pH does not fluctuate and is the same at the various points of measurement, the agitation provided is ordinarily sufficient.

In addition to controlling the pH as already mentioned, it is critical in the processes of the present invention to control the temperature within the range of 88 to 90° C. during the ion-exchange reaction. The art is already well acquainted with various heating means and thermostatic controls for governing temperatures within narrow limits and any of the well known devices can be used. Heating means such as steam-coils, electric heaters, steam-jackets, and direct steam injection can be used, the latter being preferred. Automatic controls on the heating means provide the necessary limitation to temperatures of 88 to 90° C.

In processes of this invention the silicate solution is added over a period of 27 to 33 minutes. The rate at which to add the silicate is determined by the size of heel and the desired silica-to-heel ratio. The silicate is added at a constant rate such that it will all be in the mixture in the specified time.

The initial portion of the silicate addition is made to a heel of water, to raise the pH to from 8.3 to 8.7. The ion-exchanger and additional silicate is then added, at rates, relative to each other, that the pH remains at from 8.3 to 8.7. Of course, as the reaction proceeds the heel becomes a silica sol of increasing concentration. The silica liberated by removal of sodium from the silicate via ion-exchange adds on to silica particles already in the sol so that such particles grow as dense, substantially discrete particles.

While the silicate addition is described above as a batch procedure, it will be understood that the addition can also be carried out in stages, so that the effect of a substantially continuous process is achieved. Thus, with enough stages (i.e. pots in series) having a hold-up equivalent to the specified batch time, one could get essentially the same result.

The pounds of silica as silicate added per pound of water in the heel is from 0.236 to 0.304. This ratio is carefully controlled in order to produce sols of minimum turbidity. Water in the heel is defined as the total weight present immediately prior to the first addition of sodium silicate. Any evaporation or addition of water during the heel heating process must be compensated for.

The sols produced as above described preferably have a silica content above about 15 percent $SiO_2$ and this may range up to, say, 43 percent $SiO_2$, the maximum concentration being governed by the concentration of the starting silicate solution and the method of heating. In a preferred aspect of the invention sols of silica content from 10 to 20 percent are directly produced by control of the silica:water ratio as already described.

The sols have minimum turbidity. Turbidity can be determined as follows:

The light transmitted by the sol is measured on the linear scale of a Fisher Electrophotometer AC model using a B525 green filter and a 23 milliliter cylindrical cell as compared to the light transmission of distilled water in the same cell or a matched cell using the same filter.

The invention will be better understood by reference to the following illustrative example.

Sodium silicate solution of 3.25 weight ratio of $SiO_2/Na_2O$, containing 26.5 weight percent $SiO_2$, was fed into an agitated pot containing 84 pounds of water at 88° C. When the pH of the solution in the pot reached 8.5, a stream of cation exchange resin in the hydrogen form (Dowex 50) was added at a substantially constant rate and the sodium silicate stream was controlled to such a rate of addition that the pot pH remained at 8.5. At the same time steam was injected into the solution to keep the pot temperature at 88° C. The resin had been regenerated to a capacity of .07 pound equivalents of hydrogen ion per cubic foot and blown with air to remove entrained water.

After approximately 30 minutes operation in this fashion, the resin feed was stopped, and the silicate feed was stopped shortly thereafter. A total weight of 91 pounds of silicate solution had been added over a 31 minute addition period, so that the silica-to-water heel ratio for the run was 0.29 as calculated from the formula:

$$\text{Ratio} = \frac{\text{Lbs. silicate added} \times \text{percent } SiO_2 \text{ in silicate}}{\text{Lbs. water in heel}}$$

After separating the so-formed silica sol from the resin by filtration on a screen, the properties of the sol were measured as follows:

Turbidity (measured as described above)_____ 6.0.
Area (determined by caustic titration)___ 222 m.²/g.
Concentration _____ 10.7% $SiO_2$.

We claim:

In a process for producing an aqueous silica sol having a turbidity not substantially greater than about 6, as measured on the linear scale of a Fisher Electrophotometer AC model using a B525 green filter and a 23 milliliter cylindrical cell and comparing the light transmitted to the light transmitted by distilled water in the same cell, by neutralizing the alkali in an alkali metal silicate solution with a cation-exchanger in the hydrogen form at a pH above 8 while agitating the exchanger, the steps comprising conducting the ion-exchange reaction at a temperature of 88 to 90° C., a sufficient proportion of the silicate being added to a heel of water to give a solution having a pH of 8.3 to 8.7 and additional silicate solution and ion-exchanger in hydrogen form being added to the heel over a period of 27 to 33 minutes and at such rates that the pH remains in the range from 8.3 to 8.7, and the pounds of $SiO_2$ added per pound of water in the heel being from 0.236 to 0.304, all said silicate additions being made as alkali-metal silicate aqueous solutions having an $SiO_2$ content of about from 25 to 28.5% by weight.

References Cited in the file of this patent

UNITED STATES PATENTS 2,574,902     Bechtold et al. _____ Nov. 13, 1951
2,631,134     Iler et al. _____ Mar. 10, 1953